Patented Oct. 5, 1954

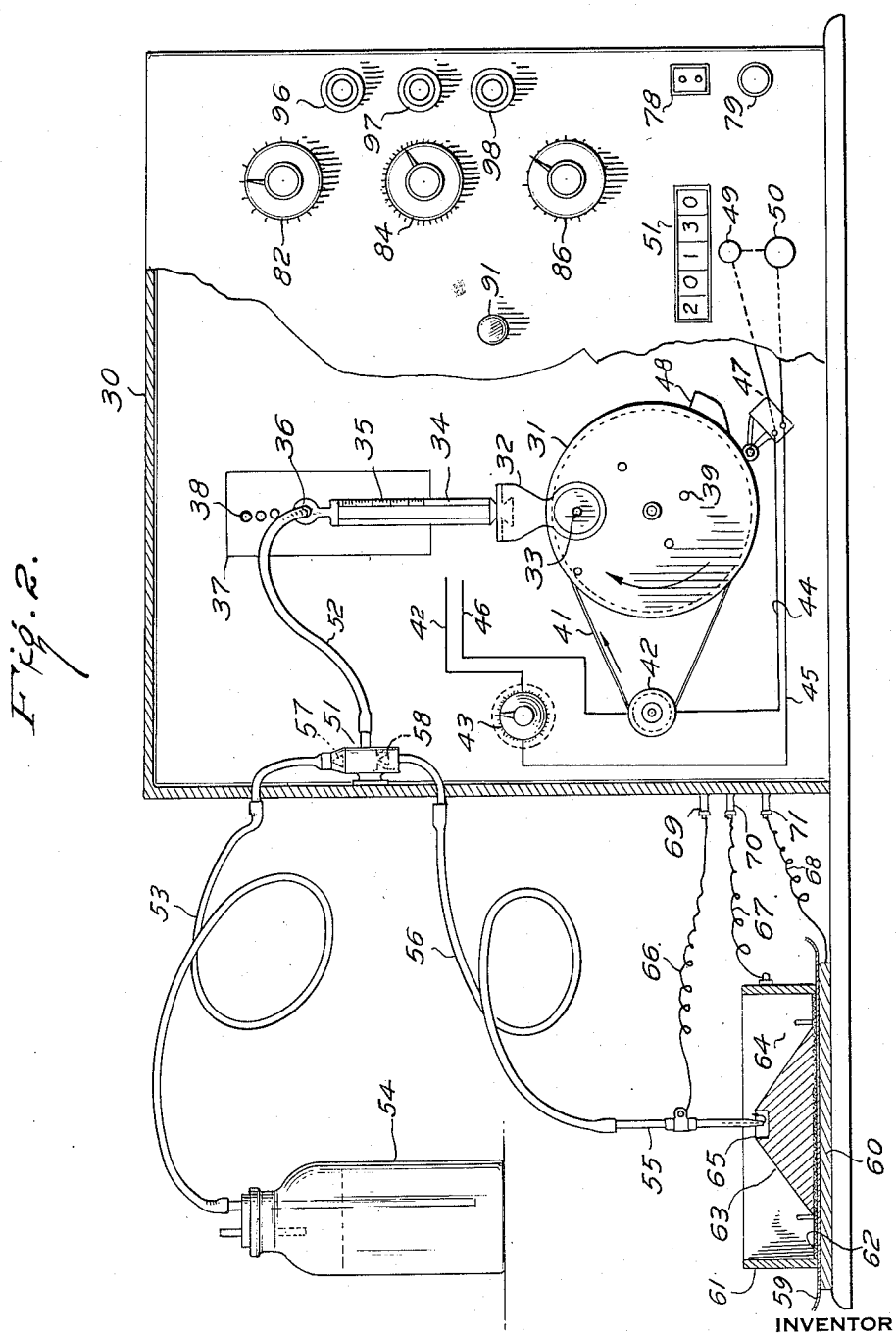

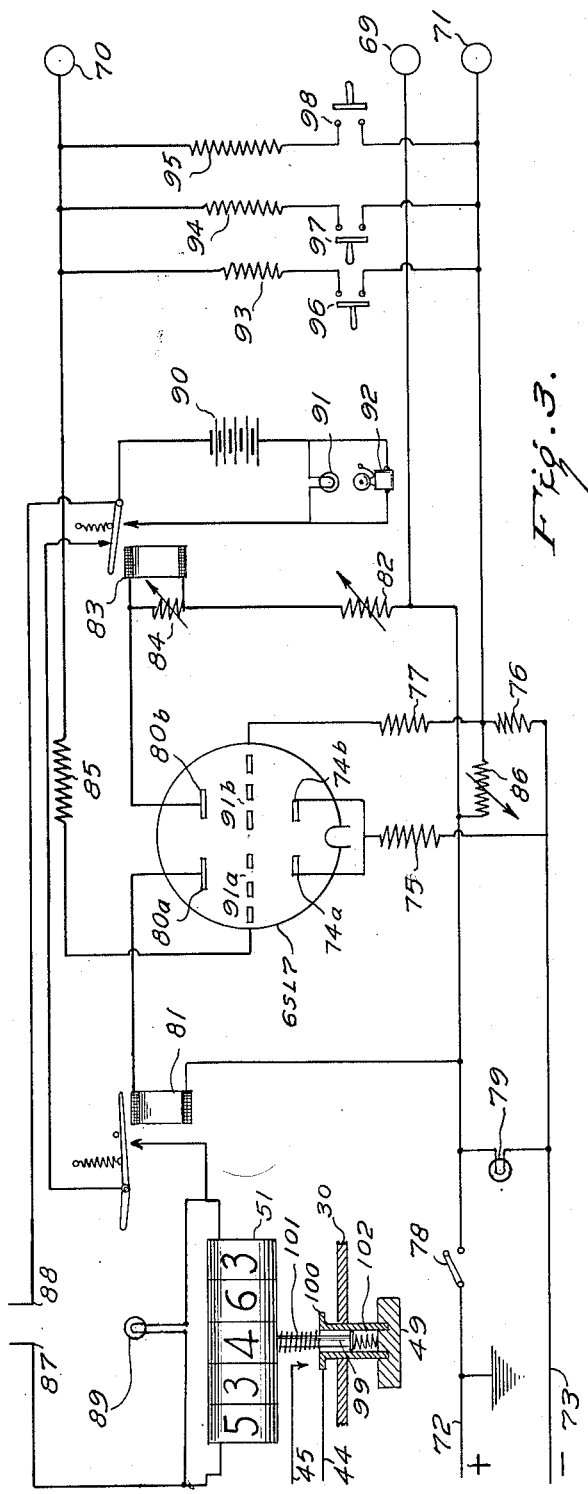

2,691,135

UNITED STATES PATENT OFFICE 2,691,135

AUTOMATIC INSTRUMENT FOR DETERMINING PERMEABILITY OF POROUS DIELECTRICS

William M. Wooding, Springdale, Conn., assignor to American Cyanamid Company, New York, N. Y., a corporation of Maine Application March 26, 1952, Serial No. 278,692

5 Claims. (Cl. 324—65)

The present invention relates to a device for measuring the resistance of a porous dielectric to penetration by an electroconductive liquid. More particularly, the present invention relates to an automatic device for measuring the resistance of such porous materials as paper, cardboard, and paper board to penetration by an electroconductive liquid, as a function of the time required for the conductivity of the dielectric to rise to a predetermined value as the result of passage of electroconductive liquid therethrough.

In the past, the resistance of materials of this type, and particularly paper to penetration by such liquids as water, ink, blood, and dilute and concentrated acids and alkalies, has been performed by applying the selected liquid, absorbed in a sponge or felt, to a sheet of the dielectric supported on a dry electroconductive mount, and noting the time required for an electric current supplied to the sponge or felt to complete the circuit through the dielectric and actuate a galvanometer, one side of which is attached to the sponge or felt through an electric battery and the other side to the mount. The resistance of dielectric to penetration by the liquid is determined by starting a stop watch at the instant the sponge or felt is placed on the dielectric and by stopping the stop-watch when the galvanometer needle has risen to a predetermined value.

Instruments of this type possess a number of disadvantages. In the first place, they find little use for the testing of thin or highly permeable materials such as onion skin paper or blotting paper. With materials of this type, the interval between contact of the wet sponge or felt pad with the paper and the subsequent motion of the galvanometer needle is so very brief that it cannot be accurately measured by the stop watch employed.

An additional disadvantage is that when dielectrics of an intermediate range of permeability are tested, for example, cardboard or well sized paper, one operator cannot operate more than one instrument, as watching the galvanometer, which may rise at any moment, demands his complete attention. Since testing dielectrics of this type requires up to ten minutes, this requirement involves appreciable cost.

A more serious disadvantage is that the instrument is subject to a variety of errors which cannot readily be compensated or eliminated. For example, the results are influenced by the amount of liquid delivered to the dielectric, and this in large part depends on the degree with which the sponge or felt is saturated with the liquid, with the surface tension of the liquid, and with the ability of the sponge or felt to release the liquid when in contact with the dielectric. Results vary with the type of sponge or felt employed, and with the firmness with which it is made to contact the dielectric. Then, certain dielectrics, represented by paper, contain soluble ionizable compounds which are picked up by the sponge or felt at each contact, causing the conductivity of the liquid in the sponge or felt to increase cumulatively from test to test. Another such variable is the human error involved in starting and stopping the stop-watch at the commencement and conclusion of the test.

An even more serious disadvantage stems from the fact that the instrument contains no means permitting its accurate and rapid calibration against a standard. As a result, changes in the sensitivity of the instrument because of climatic conditions, or the deterioration of its components cannot readily be detected, and it has not been found possible to form a group of these instruments in which each instrument will yield data directly comparable with the data produced by any other instrument in the group.

These and other disadvantages are overcome by the instrument of the present invention. In this instrument a sample of a normally dry, porous dielectric is supported on an electroconductive mount therefor, and water-impermeable electroconductive collar is positioned on the sample, the collar, the sample and the mount being in register. An electrode is positioned over or within the collar and is spaced and insulated therefrom, so that the space between the collar and the electrode can be bridged by a short stream or by a few drops of water. Means are provided for delivering the desired amount of an electroconductive liquid into the collar. The apparatus includes automatic means for starting an electrical timer the instant the space between the electrode and the collar is bridged by delivery of the liquid into the collar, and automatic means for stopping the timer when the space between the collar and the electroconductive mount is bridged by passage of the liquid through the porous dielectric to the mount. In a preferred embodiment the instrument comprises calibration components by the use of which the instrument may be adjusted to any predetermined sensitivity, permitting on the one hand earlier tests to be repeated exactly, and permitting on the other hand any one instrument to be used as a unit in a group of standardized instruments. The preferred form of apparatus also includes an automatic burette for delivering a predetermined amount of liquid to the collar so combined with an electrical timer that the timer is reset to zero when the automatic burette is actuated.

The invention will be further described with reference to the drawings, in which the same numerals designate the same components. In the drawings:

Figure 2 is a front elevation of a preferred form of instrument according to the present invention housed in a cabinet partly cut away to show an automatic burette within, and showing a vertical section of another form of electroconductive collar and sample mount;

Figure 3 represents schematically one electronic circuit which may be employed to start and stop the time recorder of Figure 2;

Figure 4 is a horizontal plan of another form of collar, viewed from above, and

Figure 5 is a vertical section along line A—A' of the collar of Figure 4.

Figure 1:
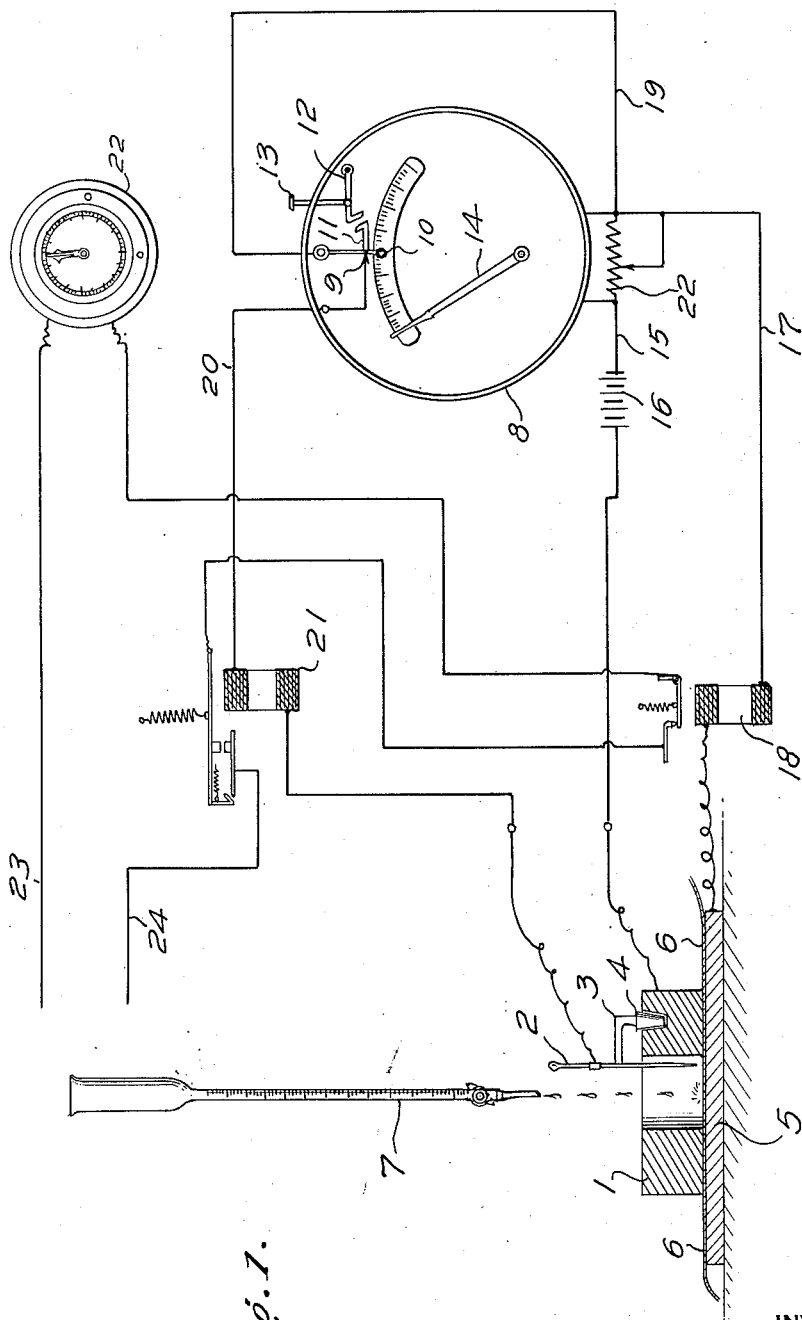
Figure 1 is a schematic illustration of one form of instrument embodying the principles of the present invention; showing in section one form of collar mount.

In Figure 1, metal collar 1 contains metal electrode 2 supported by right-angled bracket 3, one end of which is embedded in soft rubber insulating plug 4 fitting tightly in collar 1. The distance between the tip of electrode 2 and the inner wall of collar 1 is about 2 mm. The sample of paper 6 to be tested is placed on metal mount 5 below collar 1, and is in mechanical contact both with the collar and with the mount. Burette 7 is shown as delivering a predetermined amount of water into collar 1.

Galvanometer 8 is of the circuit-breaking type and includes fixed switch point 9, pivoted switch arm 10 having latch 11 rigidly attached thereto, pivoted arresting latch 12 releasable by pin 13, and pointer 14. The length of pointer 14 is such that in swinging to the right it engages movable switch arm 10, breaking the circuit at switch point 9, and causing latch 11 to interlock with latch 12.

One side of galvanometer 8 is connected to collar 1 by wire 15, which contains electric battery 16. The other side of galvanometer 8 is connected both to mount 5 and to electrode 2. The connection to mount 5 is by wire 17 containing normally-closed relay 18. The connection to electrode 2 is by wire 19, switch arm 10 in galvanometer 8, and wire 20 containing normally open relay 21 which locks when in the shut position. Potentiometer 22 connecting wire 15 with wires 17 and 19 permits the sensitivity of galvanometer 8 to be controlled so that when the circuit between collar 1 and electrode 2 is bridged, the galvanometer needle will be carried past switch arm 10 without overloading the galvanometer. Electric timer 22, powered by alternating current from source 23—24, is connected in series with armatures of relays 18 and 20, and runs when relay 21 is energized and when relay 18 is in its normally closed position.

In the operation of the device of Figure 1, paper sheet 6 is inserted between collar 1 and mount 5. A predetermined amount of water at least sufficient to cause ultimate saturation of the paper within collar 1 is then admitted from pipette 7. The first few drops of water bridge the gap between collar 1 and electrode 2. Current from battery 16 flows through this bridge to relay 21, which closes and locks shut, starting timer 22. In addition, this current causes galvanometer needle 14 to swing sufficiently far to the right to open the circuit between wires 19 and 20 and to cause latch 11 to engage with latch 12. Upon opening the circuit between wires 19 and 20 the galvanometer needle at once returns to zero, but current continues to flow through timer 22. When a liquid bridge between collar 1 and mount 5 has been established by passage of the water through paper 6, relay 18 opens, breaking the circuit to timer 22 and marking completion of the test. The exact time required for a liquid bridge to form across sample 6 is thus automatically and accurately measured. For the next test, collar 1 and mount 5 are dried, galvanometer 8 is reset by raising pin 13, and relay 21 is unlocked.

In Figure 2, the automatic burette comprises driving wheel 31, connecting rod 32, piston 34 in cylinder 35 which is suspended from pivoted bearing 36 in panel 37. Connecting rod 32 is attached eccentrically to wheel 31 by rotatable bearing 33. Driving wheel 31 and panel 37 are both provided with numerous holes exemplified by 38 and 39, permitting the stroke of piston 34 to be varied within wide limits with respect to cylinder 35.

Driving wheel 31 is slowly rotated clockwise by electric motor 40 through belt drive 41. Power to the motor is supplied from an outside source by circuit 42—46, and the speed of the motor is controlled by rheostat 43. Spring-loaded switch 47, normally closed, is mounted adjacent to wheel 31, and opens when contacted with stud 48 on wheel 31. Pushbutton combination switch 49 and indicator lamp 50 are connected in parallel with switch 47. When lightly depressed, pushbutton switch 49 causes electric timer dial 51 to reset to zero. When further depressed this button closes the circuit between wires 44 and 45 thus starting motor 40. In normal operation button 49 is released as soon as stud 48 has cleared switch 47, thus causing piston 34 to make only one delivery stroke in cylinder 35.

Cylinder 35 is connected to double check valve 51 by flexible tube 52. One port of check valve 51 is connected by tube 53 to storage bottle 54 containing the aqueous liquid used for the test. The other port is connected to metal delivery needle 55 by flexible tube 56. Check valves 57 and 58 respectively permit liquid from bottle 54 to be drawn through tubes 53 and 52 into cylinder 35 by a downward stroke of piston 34, and to be delivered by an upward stroke of piston 34 through tubing 52 and 56 to and through needle 55.

Cardboard sample 59 is supported on metal mount 60 underneath and in register with brass cylindrical collar 61 provided with metal screen 62 soldered flush with the bottom of collar 61. The collar contains metal liquid distribution cone 63 which prevents undue or intense local wetting of the cardboard by thin, high-velocity flow of the liquid from needle 55. This cone rests on screen 62 and is centered thereon by spaced metal lugs 64 soldered to the screen. The cone is provided with shallow apical well 65, the gap between the orifice of delivery needle 55 and the boundaries of the well being sufficiently close that it can be bridged by a short stream of liquid. The diameter of the orifice of the delivery needle is sufficiently small to prevent the flow of the liquid by gravity therethrough. Wires 66, 67, and 68 respectively connect delivery needle 55, collar 61, and mount 60 with the electric apparatus in cabinet 30 through binding posts 69, 70, and 71. The remainder of the apparatus of Figure 2 will be described with particular reference to Figure 3.

In Figure 3 a type 6SL7 tube, with associated components, is shown as operating in a conventional manner to control the starting and stopping of electric timer 51.

A current of about 200 volts D. C. is delivered by circuit 72—73. The negative side of this circuit is delivered to cathodes 74a and 74b through 3300-ohm resistor 75, to grid 91b through 200,000 ohm resistor 76 and 470,000 ohm resistor 77, and to terminal 71 through resistor 76.

The positive side of this circuit is delivered by wire 72 containing switch 78 and red indicator lamp 79 to anode 80a through normally open 10,000-ohm relay 81; to plate 80b through 50,000 ohm resistor 82, and 10,000-ohm relay 83 shunted by variable resistor of about 25,000 ohms, and to terminal 69. Grid 91a is attached to terminal 70 through 470,000 ohm resistor 85. The bias on grid 91b is made variable by resistor 86 of approximately 500,000 ohms.

Alternating current is supplied by circuit 87—88. When relay 81 is closed, and when relay 83 is not energized, this current flows through yellow indicator lamp 89 and electrical timer 51, to one contact of relay 83 and back through wire 88. When relay 83 is energized this flow of current is broken and current from battery 90 flows through the other contact of relay 83, actuating green indicator lamp 91 and bell 92, signalling completion of the test. Precision resistors 93, 94, and 95 respectively controlled by pushbuttons 96, 97 and 98 are provided across the lines leading to terminals 70 and 71 for purposes which will hereinafter be disclosed.

Electric timer 51 is shown schematically in horizontal plan together with its resetting button 49 shown in section. This button extends through cabinet 30, and is slidably mounted on timer resetting shaft 99. This button carries ring contact 100 connected to wire 44. A light push on button 49, transmitted by spring 102, resets the timer. A heavier push on the button closes circuit 44—45 by moving contact 100 against the terminus of wire 45. The button is returned to its normally open position by springs 101 and 102.

Figures 4 and 5 illustrate a form of collar which may be used in addition to those shown in Figures 1 and 2. Collar 110 is made by drilling four holes 111 through a brass disc, soldering 60-mesh brass screening 112 to close-fitting rings 113 forced into the bottom of each of the holes, cutting liquid delivery channels 114 slopingly from the center of the disc to each of holes 109, and drilling shallow well 115 into the apex of the central part remaining. Electric wire 116 is connected to collar 110 by threaded binding post 117.

In the normal operation of the device of Figures 2 and 3, delivery of liquid from needle 55 closes the circuit between wires 66 and 67, placing a positive bias on grid 91a, and permitting additional current to flow from cathode 74a to anode 80a. As a result, relay 81 closes, alternating current is supplied to timer 51, and yellow lamp 89 lights, signalling the commencement of the test. When a bridge has formed between mount 60 and collar 61 by passage of liquid through the sample of cardboard 59, the circuit between wires 67 and 68 is completed, changing the bias voltage on grid 91b, permitting current to flow from cathode 74b to anode 80b, energizing relay 83, and breaking the flow of alternating current through circuit 87—88. As a result, timer 51 stops and lamp 89 is extinguished. Simultaneously lamp 91 lights and bell or buzzer 92 sounds, signalling completion of the test. Lifting of the collar from its position on the wet sample deenergizes relay 83, extinguishes lamp 91 and stops buzzer 92.

In addition to button 49, only three controls are employed in the normal operation of the instrument of Figures 2 and 3. Variable resistor 86 controls the sensitivity of response of the right hand portion of the tube. Variable resistor 82 controls the current applied to relay 83, and variable shunt resistor 84 makes relay 83 more or less sensitive to the current passing through resistor 82.

It is a particular feature of the present invention, as illustrated by the embodiment shown in Figs. 2 and 3, whereby one instrument may be adjusted to any predetermined degree of sensitivity, permitting a group of instruments to be standardized so that the values yielded by each instrument in the group will be directly comparable with the results obtained by any other instrument in the group. This standardization is effected as follows.

One instrument is selected as the master instrument, and a sample of porous dielectric having a degree of porosity typical of the samples on which all the instruments of the group will be employed, is subjected to the test described above. Upon completion of the test, the time required for relay 83 to close is noted by reference to the dial of timer 51. If this time is inconveniently long or short, variable resistors 82, 84, and 86 are adjusted and the test repeated using a fresh sample of paper until relay 83 closes within a convenient time. This adjustment utilizes the fact that the conductivity of no known dielectric rises to its maximum the instant water or any other liquid is applied to one of its surfaces, but increases over a measurable period as the progress of the liquid through the dielectric proceeds. As a result, relay 83 may be made to close at widely varying points on the plot of conductivity versus time by adjusting the three variable resistors named.

Standardization of the remaining instruments of the group with the master instrument first requires that the resistance of the test sample at the moment relay 83 closed be determined. This is performed as follows. The wires to terminals 69, 70, and 71 of the master instrument are disconnected, precision resistor 93 is removed, and pushbutton 96 is closed. Resistor 93 is then successively replaced first with a precision resistor having a sufficiently high value that relay 83 will not close, and then with precision resistors of successively decreasing resistance. The final resistor which just permits relay 83 to close is made a permanent part of the instrument.

Standardization is completed by removing resistor 93 from each of the remaining instruments of the group, replacing each of the resistors so removed with a resistor identical in value to the resistor placed in the master instrument, and varying resistors 82, 84 and 86 of the instruments until relay 83 in each instrument just closes. After these calibrations have been effected, each instrument in the group will automatically yield the same results as the master instrument when tested with the same paper.

Resistors 94 and 95 are provided to permit the standardization described above to be repeated with respect to additional dielectrics of greater or less permeability than the first sample selected.

It is desirable, of course, that after the calibrations described above have been effected, in each instance the settings of variable resistors 82, 86 and 84 should be recorded for permanent reference. It is a particular advantage, however, of the instrument that it is not at all necessary to do this. Use of the precision resistors permit the original settings of the variable resistors to be redetermined very readily, and this is done merely by closing the appropriate pushbutton to throw the fixed resistor into the circuit, and then adjusting the variable resistors until relay 83 is made to close as before.

It is a further feature of these resistors that they provide a valuable means for maintaining the sensitivity of the instrument constant even when the instrument is used alone, and not as part of a group of instruments. To maintain any instrument at a predetermined level of operating sensitivity, it is only necessary to push the appropriate resistor button and adjust the three variable resistors until relay 83 is just beyond the threshold of closing, as described. By this means it becomes possible to eliminate the effect of day-to-day changes in climatic conditions, deterioration of the vacuum tube and other components, accidental resetting the control knobs of the variable resistors, and variations in the power supply.

Ordinarily, when testing such materials as paper and textiles, the height of the collar will be about ½ inch and the interior diameter of the wells will vary from about ½ inch in the case of the single unscrewed well of Figure 1 and the multiple screened wells of Figs. 4 and 5, to 1 or 2 inches or more in the case of the single screened well of Figure 1. However, when testing thick and highly porous materials, a higher collar may be necessary to receive the greater quantity of liquid needed. Samples may be tested under hydrostatic pressure very readily by increasing the height of the collar. Thus collars many feet in height are within the scope of the present invention.

In Figure 1 the bottom of the collar is not provided with a screen; this gives good results where the liquid is supplied as a low pressure stream and the dielectric shows negligible tendency to buckle when wet. When testing ordinary paper which buckles severely when wet, it is advantageous to provide the bottom of the collar with fine metal screening as shown in Figures 2, 4, and 5. The mesh of the screen should be sufficiently fine to prevent buckling of the sample but should be sufficiently coarse to permit passage of the test liquid therethrough. For testing thin paper with such mobile liquids as water a screen having about 60 wires per inch in each direction has proved suitable, particularly when pre-moistened before use. Liquid distribution cones of the type shown in the collars of Figures 2, 4, and 5 should be used where the liquid is delivered under considerable pressure. They prevent forcible penetration of the sample by the liquid when the liquid delivered at high velocity, as is normally the case. The apical well, useful in permitting an electrical contact to be formed instantly when the liquid is delivered in the form of drops, may be omitted and the delivery cone brought to a point when the liquid is delivered as a solid stream.

The present invention is not limited to the particular components shown in the drawings, and different or more sensitive instruments may readily be made incorporating the principles set forth above. The circuit shown in Figure 3, however, is sufficiently sensitive to yield excellent results when ordinary commercial paper, cardboard, and paperboard, are tested even with water which has been distilled.

Dielectrics suitable for testing in the instrument of the present invention are dry in the normal sense of the word, but may and in fact usually will contain a proportion of sorbed water. For example, book paper in its normally "dry" condition contains 6% to 10% of sorbed water. The presence of sorbed water does not preclude the testing of dielectrics in the present instrument so long as the absorptive capacity of the dielectric has not been completely satisfied.

I claim:

1. In a device adapted to measure the resistance of a normally dry porous dielectric to penetration by an electroconductive liquid, wherein a dielectric is supported on a normally dry electroconductive mount and a normally dry electroconductive water-impermeable collar is positioned on said dielectric, the mount, the dielectric and the collar being in register, and said resistance is measured as function of the time required for an electroconductive bridge to form between said collar and said mount through said dielectric when an electroconductive liquid is applied to the surface of said dielectric within said collar: the combination of an electrode spaced and insulated from said collar and so positioned that the space between said electrode and said collar is bridged by delivery of electroconductive liquid into said collar, and automatic electrical recording means cooperating with said mount, collar and electrode for recording the duration of time which begins with formation of a liquid electroconductive bridge between said electrode and said collar and which ends with formation of a liquid electro-conductive bridge between said collar and said electro-conductive mount by passage of electro-conductive liquid through said dielectric to said mount; said electrical recording means being energized and thereby started by formation of said liquid bridge between said electrode and said collar and by passage of an electric current therethrough and being de-energized and thereby stopped by formation of said liquid bridge between said collar and said mount and by passage of an electric current therethrough.

2. In a device for measuring the resistance of a normally dry porous dielectric to penetration by an electroconductive liquid, wherein a dielectric is supported on a normally dry electroconductive mount and a normally dry electroconductive water-impermeable collar is positioned on said dielectric, the mount, the dielectric and the collar being in register, and said resistance is measured as a function of the time required for an electroconductive bridge to form between said collar and said mount through said dielectric when an electroconductive liquid is applied to the surface of said dielectric within said collar; the combination of means for the delivery of electroconductive liquid into said collar; an electrode spaced and insulated from said collar and so positioned that the space between said electrode and said collar is bridged by delivery of electroconductive liquid into said collar; and automatic electrical means cooperating with said mount, collar, and electrode for recording the duration of time which begins with formation of a liquid electroconductive bridge between said electrode and said collar, and which ends with formation of a liquid electroconductive bridge between said collar and said electroconductive dielectric mount by passage of electroconductive liquid through said dielectric to said mount; said electrical means being energized by formation of said liquid bridge between said electrode and said collar and being deenergized by formation of said liquid bridge between said collar and said mount.

3. In a device for measuring the resistance of a normally dry porous dielectric to penetration by an electroconductive liquid, wherein a dielectric is supported on a normally dry electroconductive mount and a normally dry electroconductive water-impermeable collar is positioned on said dielectric, the mount, the dielectric and the collar being in register, and said resistance is measured as a function of the time required for an electroconductive bridge to form between said collar and said mount through said dielectric when an electroconductive liquid is applied to the surface of said dielectric within said collar; the combination of means for the delivery of electroconductive liquid into said collar; an electrode spaced and insulated from said collar and so positioned that the space between said electrode and said collar is bridged by delivery of electroconductive liquid into said collar; and automatic electrical means cooperating with said mount, collar, and electrode for recording the duration of time which begins with formation of a liquid electroconductive bridge between said electrode and said collar, and which ends with formation of a liquid electroconductive bridge of predetermined electrical conductivity between said collar and said electroconductive dielectric mount by passage of electroconductive liquid through said dielectric to said mount; said electrical means being energized by formation of said liquid bridge between said electrode and said collar and being deenergized by formation of said liquid bridge between said collar and said mount.

4. In a device for measuring the resistance of a normally dry porous dielectric to penetration by an electroconductive liquid, wherein a dielectric is supported on a normally dry electroconductive mount and a normally dry electroconductive water-impermeable collar is positioned on said dielectric, the mount, the dielectric and the collar being in register, and said resistance is measured as a function of the time required for an electroconductive bridge to form between said collar and said mount through said dielectric when an electroconductive liquid is applied to the surface of said dielectric within said collar; the combination of means for automatically delivering a predetermined amount of an electroconductive liquid into said collar; an electrode spaced and insulated from said collar and so positioned that the space between said electrode and said collar is bridged by delivery of electroconductive liquid into said collar; and automatic electrical means cooperating with said mount, collar and electrode for recording the duration of time which begins with formation of a liquid electroconductive bridge between said electrode and said collar, and which ends with formation of a liquid electroconductive bridge between said collar and said dielectric mount by passage of electroconductive liquid through said dielectric to said mount; said automatic time recording means comprising a resettable electrical timer; said automatic liquid delivery means being actuated by the same means by which said timer is reset; said electrical means being energized by formation of said liquid bridge between said electrode and said collar and being deenergized by formation of said liquid bridge between said collar and said mount.

5. In a device adapted to measure the resistance of a normally dry porous dielectric to penetration by an electroconductive liquid, wherein a dielectric is supported on a normally dry electroconductive mount and a normally dry electroconductive water-impermeable collar is positioned on said dielectric in register with said mount and said resistance is measured as a function of the time required for an electroconductive bridge to form between said collar and said electroconductive mount through said dielectric when an electroconductive liquid is applied to the surface of said dielectric within said collar: electrically energized timing means cooperating with said collar and said mount, said means being automatically deenergized by formation of a liquid bridge of predetermined conductivity through said dielectric between said collar and said mount.

References Cited in the file of this patent

UNITED STATES PATENTS

| Number | Name | Date |
|---|---|---|
| 1,845,231 | Browning | Feb. 16, 1932 |
| 2,491,689 | Pollock | Dec. 20, 1949 |
| 2,508,045 | Seney | May 16, 1950 |